United States Patent [19]

Schulze et al.

[11] 4,383,054
[45] May 10, 1983

[54] HYDROPHILIC HIGH POLYMERS PREPARED FROM AQUEOUS SOLUTIONS OR DISPERSIONS OF POLYOXYPROPYLENE POLYAMINE N-N'-POLYMETHYLENE SULFONATES

[75] Inventors: Heinz Schulze; Harold G. Waddill, both of Austin, Tex.

[73] Assignee: Texaco Inc., White Plains, N.Y.

[21] Appl. No.: 268,038

[22] Filed: May 28, 1981

[51] Int. Cl.$^3$ ............................................. C08L 63/02
[52] U.S. Cl. ................................... 523/131; 523/421;
528/109; 528/391; 260/513 N
[58] Field of Search .................. 260/29.2 EP, 513 N;
528/391; 564/475, 505; 523/131, 421; 252/355

[56] References Cited

U.S. PATENT DOCUMENTS

| | | | |
|---|---|---|---|
| 3,195,630 | 7/1965 | Fisher | 166/30 |
| 3,198,815 | 8/1965 | Mannheimer | 564/505 |
| 3,236,895 | 2/1966 | Lee et al. | 528/61 |
| 3,308,884 | 3/1967 | Robichaux | 166/33 |
| 3,324,041 | 6/1967 | Sommer | 252/311.5 |
| 3,933,204 | 1/1976 | Knapp | 166/295 |
| 3,960,801 | 6/1976 | Cole et al. | 260/33.6 |

OTHER PUBLICATIONS

Ger. Offen. 2,410,862 (Chem. Abst. 84, 58627k).
Ger. Offen. 2,410,860 (Chem. Abst. 84, 58688f).
Ger. Offen. 2,536,678 (Chem. Abst. 85, 22263v).
Belgian 826,629 (Abstract Only).
Ger. Offen. 2,448,958 (Chem. Abst. 85, 47530t).
Belgian 831,668 (Abstract Only).
Japan No. 5034327 (Abstract Only).
U.S. Pat. No. 3,958,638 (Chem. Abst. 85, 163113h).

*Primary Examiner*—Theodore E. Pertilla
*Attorney, Agent, or Firm*—Carl G. Ries; Jack H. Park; Harold J. Delhommer

[57] ABSTRACT

A self curing aqueous solution/dispersion comprising about 50–70 wt. % water, about 25–35 wt. % of a novel N-polymethylene substituted polyoxypropylene polyamine and about 3–9 wt. % of a curable polymer-forming component such as an epoxy-resin is described. The solution is useful for injection into permeable earth formations such as unconsolidated sands to reduce their permeability and consolidate the formation. Novel N-substituted polyamines of the formula $[NaO_3S-R_1]_mA$ wherein $R_1$ is a $C_2$ to $C_6$ polymethylene group and A is a polyoxyalkylene polyamine are employed in the solution to render the epoxy-resin component adequately soluble or dispersible in the aqueous solution and to act as the curing agent for the resin.

12 Claims, No Drawings

HYDROPHILIC HIGH POLYMERS PREPARED FROM AQUEOUS SOLUTIONS OR DISPERSIONS OF POLYOXYPROPYLENE POLYAMINE N-N'-POLYMETHYLENE SULFONATES

BACKGROUND OF THE INVENTION

This invention concerns aqueous solutions of polyoxyalkylene, di, tri or tetra amines substituted at the amine position with a polymethylene sulfonate group such as polyoxypropylene diamine N-N'-dipolymethylene sulfonate, which may be used to carry in aqueous solution other constituents reactable with the amino and/or hydroxy substituent of the polymethylene sulfonate substituted polyoxyalkylene amine to produce hydrophilic high molecular weight polymers. Such solutions are useful for stabilizing soil permeability and sealing subterranean zones, such as a permeable earth formation that is penetrated by a well bore for the production of crude oil.

The necessity for decreasing the permeability of or consolidating various subterranean formations, such as loose or unconsolidated reservoir sands, has long been known. Several processes have been proposed for doing so by injecting pumpable fluids into such formations which, when in place, polymerize or otherwise react to become highly viscous and act as a flow-resistant gel. The need often arises in the drilling for oil wherein water enters the bore hole from water-bearing formations and interferes with the drilling operation.

Examples of such gel forming fluids may be found in U.S. Pat. No. 3,195,630 describing aqueous solutions of urea and metal salts which react to form a gel, U.S. Pat. No. 3,308,884 describing epoxy amino resin-forming constituents with aromatic solvents that become flow-resistant gels, and U.S. Pat. No. 3,324,041 describing an emulsion of asphalt, polyamides and polyepoxy polymers that set to form materials of high viscosity. However, such gel-forming processes cannot always be successfully employed. In unconsolidated reservoir sands the portions of the sand plugged by the gel are often displaced into the well. In other formations wherein permeability is relatively low at the outset, such gelling emulsions are often too viscous to satisfactorily penetrate into the reservoir.

Other processes have been proposed that plug loose sands by converting them to consolidated, compression-resistant plugs. However, such processes tend to be undesirably or prohibitively expensive in many situations.

Pumpable epoxy-resin compositions for sealing subterranean zones have been proposed. U.S. Pat. No. 3,933,204 describes an aqueous emulsion which contains an epoxy-resin forming polyepoxy polymer, an acrylic-resin forming polycarboxy polymer and a polymerization rate controlling substance that causes the emulsion to set to a resinous plug after implacement in a formation. U.S. Pat. No. 3,960,801 describes an epoxy-resin composition for sealing a subterranean zone about a well bore, which composition contains a select aromatic diluent and curing agent that sets to an impermeable matrix closing access to the zone from the well bore.

So far as is presently known, there has not yet been proposed an epoxy-resin composition for sealing subterranean formations that employs a polyoxypropylene polyamine as the curing agent. Polyoxypropylene polyamines, such as illustrated and described in U.S. Pat. Nos. 3,236,895 and 3,462,393 are known to be excellent curing agents that impart highly desirable mechanical properties to a cured epoxy-resin, which properties would also be desirable when an epoxy composition is employed to alter the permeability of or plug a formation. Further, such polyoxypropylene polyamines generally have low viscosities and produce resins with low initial viscosities, a highly desirable property wherein the resin is to be injected into a permeable formation prior to curing. However, polyoxypropylene polyamines have not been employed as the curing agent for an aqueous epoxy-resin composition designed for injection into the subterranean formation because of the poor dispersion charcteristics of such components when placed in water solutions. The primary drawback is that the epoxy resin is not readily soluble in a water carrier, hence at best it only forms an emulsion that is difficult to inject. Although the polyoxypropylene polyamine is readily water soluble, it does not assist the solubility or dispersibility of the epoxy component. Therefore, although an amine-epoxy-water system would appear to be desirable, heretofore such systems were not practical due to the difficulty of injecting such formulation into the formation.

It has now been discovered that a polyoxypropylene polyamine may be chemically modified to make it suitable as an aqueous dispersing curing agent for epoxy-resin compositions and that when so modified it will still impart to the cured-in-place resin many of the desirable physical properties normally associated with resins cured by unmodified polyoxypropylene polyamine curing agents. The chemical modification to the amine renders it capable of making the epoxy component readily soluble or finely dispersible in aqueous solutions, hence producing a curable aqueous epoxy-resin solution that is readily injectable into underground formation.

SUMMARY OF THE INVENTION

Novel N-polymethylene sulfonate substituted polyoxyalkylene polyamines of the formula

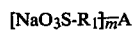 (I)

where $R_1$ is a polymethylene group or a hydroxy substituted polymethylene group having from 2 to 6 carbon atoms, m is 2 to 4 and A is a polyoxyalkylene polyamine are described.

A water soluble-dispersible two component system is described comprising the N-polymethylene sulfonate substituted polyoxyalkylene polyamine of this invention and a second component, preferably an epoxy-resin, which is curable by reaction with said substituted polyamine to produce a hydrophilic high molecular weight polymer. The solution, when injected into an unconsolidated sand formation, is capable of curing to a hydrophilic polymer within adjustable curing times, depending upon the initial concentration and chemical nature of the components, which will reduce the permeability of a formation. The second, or curable component, may be an epoxy-resin a diisocyanate or its bisulfite adduct, or a tetracarboxylic acid dianhydride or other like curable polymer forming components.

DESCRIPTION OF THE PREFERRED EMBODIMENTS

The present invention comprises a self curing aqueous solution/dispersion of N-polymethylene sulfonate substituted polyoxyalkylene polyamines and a curable polymer-forming component that is curable within adjustable time limits to form a high molecular weight hydrophilic polymer. The self curing solution is useful for reducing the permeability of or plugging subterranean formations and stabilizing loose earth formations, particularly unconsolidated sands.

The N-polymethylene sulfonate substituted polyoxyalkylene polyamines of this invention which are useful to prepare the plugging agent of this invention are themselves novel compounds of the formula $$[NaO_3S-R_1]_{\overline{m}}A \qquad (I)$$

$R_1$, m and A are as previously defined, with $R_1$ preferably being a trimethylene of the following formula:

$$-CH_2-CH_2-CH_2-$$

or $$-CH_2-\overset{OH}{\underset{|}{CH}}-CH_2-.$$

Such novel N-polymethylene sulfonate substituted amines are prepared from that class of polyoxyalkylene polyamines (A in the formula I) which are aliphatic, terminally-branched, primary, di- and triamines, structurally derived from polyalkylene glycols and triols. Such polyoxyalkylene polyamines are known and commercially available, such as for instance those sold under the trademark of JEFFAMINE® by Texaco Chemical Company. The polyoxyalkylene polyamines useful in the practice of this invention are prepared by reacting an oxyalkylation susceptible polyhydric alcohol such as ethyleneglycol or propyleneglycol, glycerine, trimethylolpropane or sorbitol with an epoxide such as propylene oxide, using known methods. The resulting material is then reacted with ammonia in the presence of hydrogen and a catalyst using, for example, the method described in U.S. Pat. No. 3,654,370. The prepared catalyst is described in U.S. Pat. No. 3,152,998.

Particularly suitable polyoxyalkylene polyamines from which the novel N-polymethylene sulfonate substituted polyoxyalkylene polyamines may be prepared are the polyoxyalkylene diamines of formula II $$H_2N-\overset{R}{\underset{|}{CH}}-CH_2+OCH_2-\overset{R}{\underset{|}{CH}}\overline{)_x}NH_2 \qquad (II)$$

wherein each R is independently hydrogen or a $C_1$ to $C_6$ alkyl and x is a number from about 2 to about 40, and preferably from about 2.6 to about 33.1. Other useful diamines are represented by formula III $$H_2N-\overset{CH_3}{\underset{|}{CH}}-CH_2+O-\overset{CH_3}{\underset{|}{CH}}-CH_2\overline{)_w}[OCH_2CH_2]_y[OCH_2\overset{CH_3}{\underset{|}{CH}}\overline{)_z}NH_2 \qquad (III)$$

wherein w plus z is a number from about 2 to about 10 and y is a number from about 1 to about 100. Triamines useful for preparing N-polymethylene sulfonate substituted polyoxyalkylene triamines are represented by formula IV

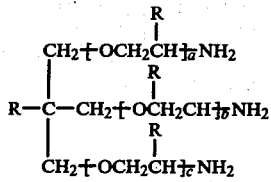

wherein R is as previously defined and a, b and c are each independently numbers from about 1 to about 15.

The novel N-polymethylene sulfonate substituted polyoxyalkylene polyamines may be conveniently prepared from the polyoxyalkylene polyamines as described above by reaction with a chlorinated polymethylene sodium sulfonate such as depicted by formula V $$Cl-R_1-SO_3Na \qquad (V)$$

wherein $R_1$ is a $C_2$-$C_6$ polymethylene group or a $C_2$-$C_6$ polymethylene group that contains hydroxy substituents.

The polyoxyalkylene polyamines of preference are polyoxypropylene diamines, such as, for example, JEFFAMINE D-230, D-400, D-1000 and D-2000 (wherein D designates the material as a diamine and the following number is the average molecular weight of the material) and polyoxypropylene triamines such as JEFFAMINE T-403 (T designates a triamine prepared from a trimethylolpropane initiator and the following number is the average molecular weight). The chlorinated polymethylene sodium sulfonates of preference for reaction with the polyoxyalkylene polyamines are chlorinated trimethylene sulfonates such as 3-chloropropane sodium sulfonate and most preferably 3-chloro-2-hydroxypropane sodium sulfonate.

The novel N-polymethylene sodium sulfonate substituted polyoxypropylene polyamines may be readily prepared by placing stoichiometric amounts of the reactants in an alcohol solvent containing a sufficient amount of base to take up liberated acid. Thereafter the reaction mixture is agitated at elevated temperature, such as about 85° C., until the reaction is complete. The alcohol may be any of the common alcoholic solvents such as methanol, ethanol, propanols or the like. The base may be any of the commonly used bases such as sodium carbonate, sodium bicarbonate, sodium hydroxide or other alkali metal bases.

According to the invention, the novel N-polymethylene sodium sulfonate substituted polyoxypropylene polyamines may be employed as the curing agent for any general epoxy-resins. Illustrative of epoxy-resins useful in this invention are the polyglycidyl ethers of mononuclear polyhydric phenols or polynuclear polyhydric phenols.

The epoxides used in this invention are those containing more than one vicinal epoxy group per molecule. The epoxy resins may be described in terms of epoxy equivalent values, meaning the number of epoxy groups contained in the average molecule of which the resin is comprised. If the epoxy resin consisted of a single pure compound, the epoxy equivalent values would be an integer such as 2, 3, 4 or the like. But, since the resin material comprises a mixture of epoxide components of varying epoxide number and molecular weight, the epoxy equivalent value for an actual material may be quite low and contain fractional values, such as 1.7, 1.9, 2.0, 2.3 and the like. The actual epoxy equivalency of the epoxy-resins useful in this invention is preferably greater than one. Though the molecular weights of the materials may be substantially greater, the average molecular weight of the preferred epoxy-resins ranges between 350 to 450. The epoxy equivalent weight of any given epoxy resin is its average molecular weight divided by its epoxy equivalent value.

Examples of the polyepoxides include, among others, 1,4-bis(2,3-epoxypropoxy)benzene, 1,3-bis(2,3-epoxypropoxy)benzene, 1,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-methoxy-3,4-epoxybutoxy)diphenyl dimethylmethane, 1,3-bis(4,5-epoxypentoxy)-5-chlorobenzene, 1,4-bis(3,4-epoxybutoxy)benzene, and 1,4-bis(2-methoxy-4,5-epoxypentoxy)benzene.

Preferred polyepoxides are the glycidyl polyethers of the dihydric phenols, and especially of 2,2-bis(4-hydroxyphenyl)propane, having an epoxy equivalency between 1.0 and 2.1, preferably at least 1.4, and a molecular weight between 250 and 900. Most preferred are the normally liquid products having a molecular weight of about 350 to 450 and an epoxy equivalent valve of about 1.75 to 2.1, typically 1.85. The most preferred epoxy resins are those having an epoxy equivalent weight of from about 175 to about 210.

EXAMPLE 1

Preparation of Polyoxypropylene Diamine N,N'-bis(2-Hydroxy Trimethylene Sodium Sulfonate)

Polyoxypropylene diamine (JEFFAMINE D-2,000, 971 g., 0.5 mole, 1.03 meq./g. primary amine), sodium bicarbonate (90.0 g., 1.07 mole), and 3-chloro-2-hydroxypropane sodium sulfonate (213.2 g., 1.05 mole) were placed in solution with a solvent comprising isopropanol (250 ml.) and water (50 ml.). The reaction mixture was heated to about 85° C. and stirred for 20 hours by which time the reaction had reached completion. The reaction mixture was then diluted with isopropanol (250 ml.) and sufficient water to give a total weight for the solution of 3,344 g. The final product (34.0% by weight) was a clear viscous foaming solution containing polyoxypropylene diamine N,N'-bis(2-Hydroxy Trimethylene Sodium Sulfonate). When diluted 1:50 with water the solution had a pH of 10.2. Analysis showed the solution to have 0.30 meq./g. of chlorine and 0.31 meq./g. of total base content.

Aqueous solutions of the N-substitute amine and epoxy-resins may be readily prepared by metering the desired amount of epoxy-resin with agitation into an aqueous solution of the N-substituted amine. Generally, the preferred composition of the final aqueous solution will comprise 50–70% wt. water, the remainder comprising the N-substitute amine and epoxy-resin. The N-substituted amines may be employed as curing agents for the epoxy resin components in amounts which range from as low as 20% of the stoichiometric amount (calculated on the basis of the N-substituted amines epoxy equivalent weight) up to and including 120% of the stoichiometric amount required by the epoxy resin. Thus the final solutions when prepared and ready for injection into a formation will comprise from about 50 to about 70 wt% water, from about 25 to about 35 wt.% N-substituted amine, and from about 3 to about 9 wt.% epoxy-resin. Preferably, the solutions should comprise about 4 to about 7 wt.% epoxy-resin and the N-substituted amine is present in from about 30 to about 100% of the stoichiometric quantity necessary for complete reaction with the resin employed.

The precise amounts of N-substituted amine to epoxy-resin to water will, on a weight percent basis, depend upon the amine content of the N-substituted amine, the epoxy equivalent weight of the epoxy resin employed and the stoichiometric ratio of N-substituted amine to epoxy-resin one desires to employ. The required amounts of each component may be readily calculated in advance of preparing a solution by use of the following formulas:

$$W_{na} = \frac{DS(1-B)}{DS(1-B)} \times W_s$$

$$W_r = \frac{R(1-B)}{DS+R} \times W_s$$

$$W_w = W_x \times B$$

wherein
$W_s$ = the total weight of solution desired
$W_{na}$ = weight of the N-substituted amine
$W_r$ = weight of the epoxy-resin
$W_w$ = weight of the water
$B$ = the desired weight fraction of solution comprising water
$R$ = the equivalent weight of the epoxy-resin employed in the solution
$D$ = the stoichiometric fraction of the N-substituted amine to be used as the curing agent for the resin
$S$ = the stoichiometric amount of N-substituted amine, which is determined as a function of the amine functional content of the N-substituted amine measured as meq. of titrable. Cl per gram of N-substituted amine (meq.g Cl). Hence, $$S = \frac{1000}{(\text{meq/g Cl})}$$

Employing the above equations, if one desired to make 342 parts of a finished solution with a water content of 62.5% by weight, using an epoxy-resin having an equivalent weight of 190 with one third (⅓) of the stoichiometric amount of an N-substituted amine as a curing agent and the amine had an amine content value measured as 0.30 meq/g Cl, then using the above equation one would calculate the following values:

$$W_{na} = \frac{(\frac{1}{3})(3333.3)(1 - 0.625)}{(\frac{1}{3})(3333.3) + 190} \times 342 = 109.5$$

$$W_R = \frac{(190)(1 - 0.625)}{(\frac{1}{3})(3333.3) + 190} \times 342 = 18.7$$

$$W_w = 342 \times 0.625 = 213.7$$

$$W_s = W_{na} + W_R + W_w = 341.9$$

In accordance with the above, the final solution would comprise about 62.5% wt. water, 5.5% wt. epoxy-resin and 32.0% wt. N-substituted amine.

An aqueous solution or dispersion of N-polymethylene sulfonate substituted polyoxyalkylene polyamine and an epoxy-resin suitable for injection into a permeable formation may readily be prepared at the work site just prior to actual injection. The pumpable solution is prepared by metering the desired amount of epoxy-resin into an aqueous solution of the N-polymethylene sulfonate substituted polyoxyalkylene polyamine while the aqueous amine solution is agitated. The epoxy-resin may be metered at any rate provided that with the agitation employed the epoxy-resin is dispersed as it is metered in. To assist dispersion of the epoxy-resin, the aqueous amine solution may be preheated to a temperature above ambient up to and including that at which the solution refluxes.

Example 2 illustrates the preparation of a pumpable N-substituted amine-epoxy fluid of the invention. Further, the example illustrates the rate at which such pumpable fluid sets to a stiff gel at ambient temperature. Of course, when injected into an underground formation wherein the temperature is above ambient, the setting time of the gel will correspondingly decrease.

EXAMPLE 2

To prepare the pumpable aqueous N-substituted amine-epoxy solution of the invention, 323 parts of the solution of Example 1 [comprising a 34.0 wt.% aqueous solution of polyoxypropylene diamine N,N'-(2-Hydroxy Trimethylene Sodium Sulfonate)] was heated to reflux (88° C.). With stirring a commercial epoxy-resin of bis-phenol A (Ciba 6005, 19 parts equivalent weight 190) was added dropwise in 40 minutes. Heating at reflux was continued another 30 minutes and the mixture cooled. A slightly viscous clear liquid resulted which had an initial Brookfield viscosity of 13,600 cps at ambient temperatures. The liquid was allowed to stand at ambient temperature. After 120 hours the viscosity was 52,000 cps and after 12 days the mixture had set to a stiff gel.

The pumpable N-substituted amine-epoxy aqueous solution is thus prepared it is pumped into a formation containing unconsolidated sands. The injected solution migrates into the interstices where it cures into a stiff or rigid gel thus consolidating the formation. Faster cure times than that illustrated by example 2 may be achieved by increasing the amount of N-substituted amine used as the curing agent. Further, the time within which curing is achieved will also depend upon the temperature of the formation into which the solution is injected. Higher temperatures give correspondingly shorter curing times.

In view of the disclosure here made, those of ordinary skill in the art may make modification and changes in the invention as illustrated by the description of its preferred embodiments without departing from the scope of spirit of the invention as described above or claimed hereafter.

We claim:

1. N-polymethylene sulfonate substituted polyoxyalkylene polyamines of the formula

wherein $R_1$ is a polymethylene group or a hydroxy substituted polymethylene group having from 2 to 6 carbon atoms, m is from 2 to 4 and A is a polyoxyalkylene polyamine.

2. The compounds of claim 1 wherein the N-polymethylene sulfonate substituted polyoxyalkylene polyamine is a diamine of the formula

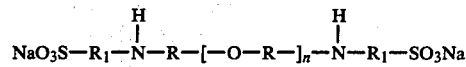

wherein R is an alkylene group containing from 2 to 5 carbon atoms, $R_1$ is a polymethylene group or a hydroxy substituted polymethylene group containing from 2 to 6 carbon atoms and n is from about 2.6 to about 33.1.

3. The compounds of claim 2, wherein $R_1$ is a trimethylene group or a 2-hydroxy trimethylene group.

4. The compounds of claim 3, comprising polyoxypropylene diamine N,N'-bis(2-hydroxy trimethylene sodium sulfonate).

5. An aqueous solution for injection into a subterranean formation to decrease the permeability of such formation, comprising:
an aqueous solution containing a N-polymethylene sulfonate substituted polyoxyalkylene polyamine of the formula

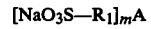

wherein $R_1$ is a polymethylene group or a hydroxy substituted polymethylene group having from 2 to 6 carbon atoms, m is from 2 to 4 and A is a polyoxyalkylene polyamine;
and an epoxy-resin; wherein
the aqueous solution contains from about 50 to about 70% by weight water, from about 25 to about 35% by weight N-polymethylene sulfonate substituted polyoxyalkylene polyamine, and from about 3 to about 9% by weight epoxy-resin.

6. The solution of claim 5, wherein the compounds of claim 1 wherein the N-polymethylene sulfonate substituted polyoxyalkylene polyamine is a diamine of the formula

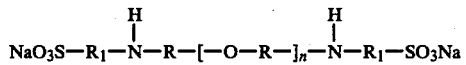

wherein R is an alkylene group containing from 2 to 5 carbon atoms, $R_1$ is a polymethylene group or a hydroxy substituted polymethylene group containing from 2 to 6 carbon atoms and n is from 2.6 to about 33.1.

7. The solution of claim 6, wherein $R_1$ is a trimethylene group.

8. The solution of claim 6, wherein the N-polymethylene sulfonate substituted polyoxyalkylene polyamine is polyoxypropylene diamine N,N'-bis-(2-hydroxy trimethylene sodium sulfonate).

9. The solution of claims 5, 6, 7 or 8 wherein the epoxy-resin is a glycidyl polyether of a dihydric phenol.

10. The solution of claim 9, wherein the epoxy-resin is resin of bis-phenol A.

11. The solution of claim 9, wherein the epoxy-resin has an epoxy equivalent weight of from about 175 to about 210.

12. The solution of claim 11, wherein the N-polymethylene sulfonate substituted polyoxyalkylene polyamine is present in an amount which is between about 20 to about 120 percent of the stoichiometric amount required for reaction with the epoxy-resin.

* * * * *